United States Patent
Chang

(10) Patent No.: US 9,207,524 B2
(45) Date of Patent: Dec. 8, 2015

(54) FAN CONTROL METHOD AND PROJECTION APPARATUS USING THE SAME

(71) Applicant: DELTA ELECTRONICS, INC., Taoyuan Hsien (TW)

(72) Inventor: Meng-Sheng Chang, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 56 days.

(21) Appl. No.: 14/144,217

(22) Filed: Dec. 30, 2013

(65) Prior Publication Data

US 2015/0042962 A1    Feb. 12, 2015

(30) Foreign Application Priority Data

Aug. 8, 2013 (TW) .............................. 102128433 A

(51) Int. Cl.
  *G03B 21/16*  (2006.01)
  *H04N 9/31*  (2006.01)
  *G03B 21/20*  (2006.01)

(52) U.S. Cl.
  CPC .............. *G03B 21/16* (2013.01); *H04N 9/3144* (2013.01); *H04N 9/3194* (2013.01); *G03B 21/2026* (2013.01)

(58) Field of Classification Search
  CPC ...... G03B 21/16; G03B 21/18; H04N 9/3144; H04N 9/3194; H04N 9/3155
  USPC ......... 353/52, 57, 69, 121; 348/730, 743–747
  See application file for complete search history.

(56) References Cited

U.S. PATENT DOCUMENTS

| 6,966,652 B1 * | 11/2005 | Lai et al. ...................... 353/52 |
| 2004/0212787 A1 * | 10/2004 | Kida et al. ................... 353/94 |
| 2005/0024600 A1 * | 2/2005 | Cole et al. .................... 353/85 |
| 2006/0012758 A1 * | 1/2006 | Fukano ......................... 353/85 |
| 2007/0052930 A1 * | 3/2007 | Ki .......................... G03B 21/16 353/57 |
| 2008/0158517 A1 * | 7/2008 | Hsiao et al. .................. 353/57 |

FOREIGN PATENT DOCUMENTS

| CN | 101365327 | 2/2009 |
| JP | 2005338213 | 12/2005 |
| TW | I322325 | 3/2010 |

* cited by examiner

*Primary Examiner* — Sultan Chowdhury
(74) *Attorney, Agent, or Firm* — Kirton McConkie; Evan R. Witt

(57) ABSTRACT

A fan control method for a projection apparatus is provided. The method includes the following steps. When the lamp is switched from a working state to a power-off state, the fan device is enabled. When a temperature of the lamp is reduced to a first predetermined temperature, the fan device is disabled. When the temperature of the lamp is reduced to be lower than a second predetermined temperature, the fan device is enabled again. When the temperature of the lamp is reduced to a re-ignition temperature, the fan device is disabled.

7 Claims, 5 Drawing Sheets

FAN CONTROL METHOD AND PROJECTION APPARATUS USING THE SAME

FIELD OF THE INVENTION

The present invention relates to a control method, and more particularly to a fan control method for a projection apparatus.

BACKGROUND OF THE INVENTION

In recent years, a variety of projectors have been widely used in various applications because projectors have many benefits such as small volume, portability and the production of enlarged images. For example, projectors can be used for making presentations, holding meetings or giving lectures in conference rooms or home theaters. For enhancing stability and marketing competition of the projector, it is important to maintain or prolong the life span of a lamp of the projector. In addition to the production quality of the lamp, the design of a heat dissipating mechanism of the projector has influence on the life span of the lamp. During operations of the projector, a great amount of heat is generated by the lamp. Generally, the projector is equipped with a fan device for removing the heat.

Nowadays, the light sources used in most projection systems are for example ultra-high pressure (UHP) mercury lamps. However, the use of the UHP mercury lamp may result in some drawbacks. FIG. 1 schematically illustrates the situation of condensing mercury vapor on an electrode of a UHP mercury lamp. FIG. 2 schematically illustrates the situation of condensing mercury vapor on an interior glass surface of the UHP mercury lamp. As shown in FIGS. 1 and 2, mercury 10 and some chemical substances (not shown) are contained in the UHP mercury lamp 1. When the UHP mercury lamp 1 is turned on, the mercury 10 in a vapor phase reacts with the chemical substances to continuously generate light. In case that the projector is switched from a working state to a power-off state, the UHP mercury lamp 1 is turned off. Since the mercury 10 has a condensation point of about 300° C., after the UHP mercury lamp 1 is turned off, the mercury 10 is changed from the vapor phase to a liquid phase. Generally, the mercury 10 may be condensed and adsorbed on an electrode 11 of the lamp burner of the UHP mercury lamp 1 (see FIG. 1), or the mercury 10 may be condensed and adsorbed on an interior glass surface 12 of the UHP mercury lamp 1 (see FIG. 2). The condensation position of the mercury 10 after the UHP mercury lamp 1 is turned off may be determined according to the cooling rate of the electrode and the cooling rate of the glass. Generally, in case that no measure is taken, the cooling rate of the electrode is faster than the cooling rate of the glass. After the fan device is switched from the working state to the power-off state, the fan device is still enabled to remove heat from the UHP mercury lamp 1. Under this circumstance, the cooling rate of the glass is faster than the cooling rate of the electrode. For increasing the life span of the UHP mercury lamp of the projector, it is preferred that the mercury vapor is completely condensed on the electrode and the lamp is turned on at the re-ignition temperature. In other words, after the projector is turned off, the lamp should be cooled down to a specified temperature (e.g. lower than 100° C.) and then the lamp may be turned on again.

From the above discussions, after the projector is switched from the working state to the power-off state, the operation of the fan device may influence the cooling time and cooling efficacy of the UHP mercury lamp. That is, the efficacy of condensing the mercury vapor on the electrode and the time period required to re-ignite the lamp are influenced by the operation of the fan device.

The conventional method of controlling the fan device of the projector fails to simultaneously achieve the function of condensing the mercury vapor on the electrode and the function of shortening the time period for cooling the lamp to the re-ignition temperature. In accordance with a conventional control method, the fan device is disabled when the lamp is switched from the working state to the power-off state. Since the cooling rate of the electrode is faster than the cooling rate of the glass, the mercury vapor is almost condensed on the electrode. However, the time period for cooling the lamp to the re-ignition temperature is very long (e.g. 8 minutes). In other words, the conventional method of controlling the fan device of the projector is not efficient.

Therefore, there is a need of providing an improved fan control method for a projection apparatus in order to avoid the above drawbacks.

SUMMARY OF THE INVENTION

The present invention provides a fan control method for a projection apparatus. When the lamp is switched from a working state to a power-off state, the fan device is still maintained in the enabled state in order to remove the heat from the lamp. Then, the lamp is disabled, so that the mercury within the lamp is condensed on the electrode of the lamp. Then, the fan device is enabled again to cool down the lamp to a re-ignition temperature. The fan control method of the present invention can achieve both the function of condensing the mercury vapor on the electrode and the function of shortening the time period for cooling the lamp to the re-ignition temperature.

In accordance with an aspect of the present invention, there is provided a method for controlling a fan device of a projection apparatus to remove heat from a lamp. The method includes the following steps. When the lamp is switched from a working state to a power-off state, the fan device is enabled. When a temperature of the lamp is reduced to a first predetermined temperature, the fan device is disabled. When the temperature of the lamp is reduced to be lower than a second predetermined temperature, the fan device is enabled again. When the temperature of the lamp is reduced to a re-ignition temperature, the fan device is disabled.

In accordance with another aspect of the present invention, there is provided a projection apparatus. The projection apparatus includes a lamp, a fan device, a temperature detector, and a controller. The fan device is used for generating a wind to remove heat from the lamp. The temperature detector is used for detecting a temperature of the lamp. The controller is electrically connected with the fan device and the temperature detector for controlling the fan device according to a detecting result of the temperature detector. When the lamp is switched from a working state to a power-off state, the fan device is enabled by the controller. When the temperature of the lamp is reduced to a first predetermined temperature, the fan device is disabled by the controller. When the temperature of the lamp is reduced to be lower than a second predetermined temperature, the fan device is enabled again by the controller. When the temperature of the lamp is reduced to a re-ignition temperature, the fan device is disabled by the controller.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
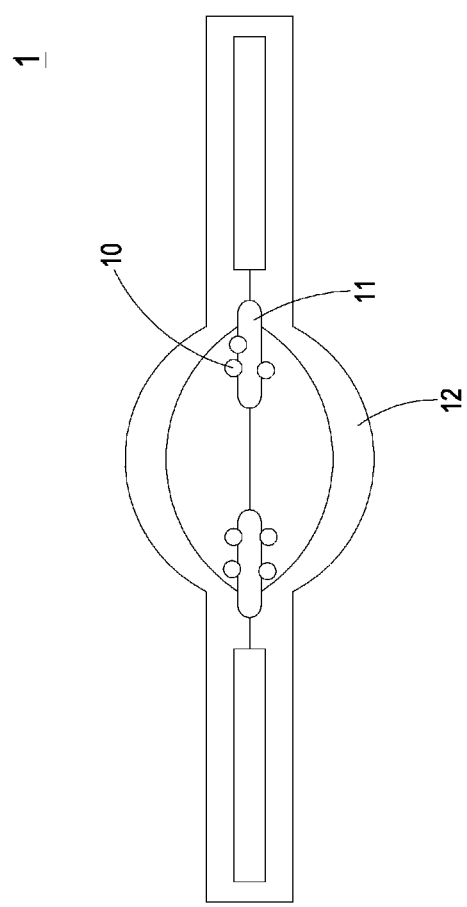
FIG. 1 schematically illustrates the situation of condensing mercury vapor on an electrode of a UHP mercury lamp.
Figure 2:
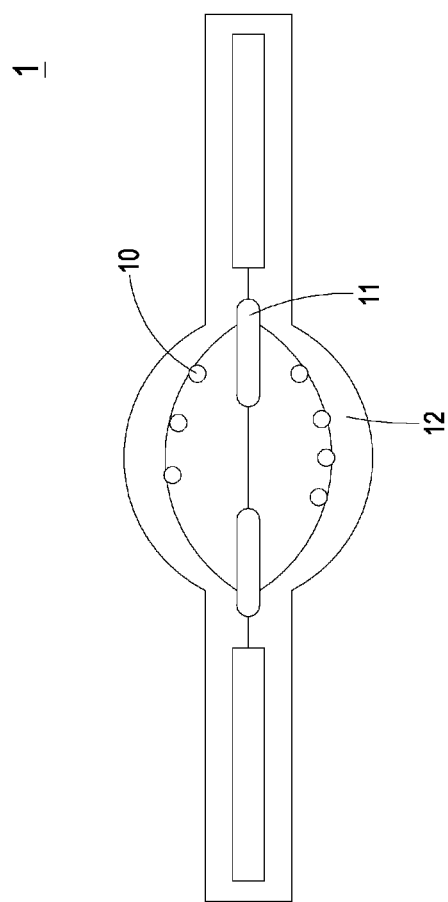
FIG. 2 schematically illustrates the situation of condensing mercury vapor on an interior glass surface of the UHP mercury lamp.
Figure 3:
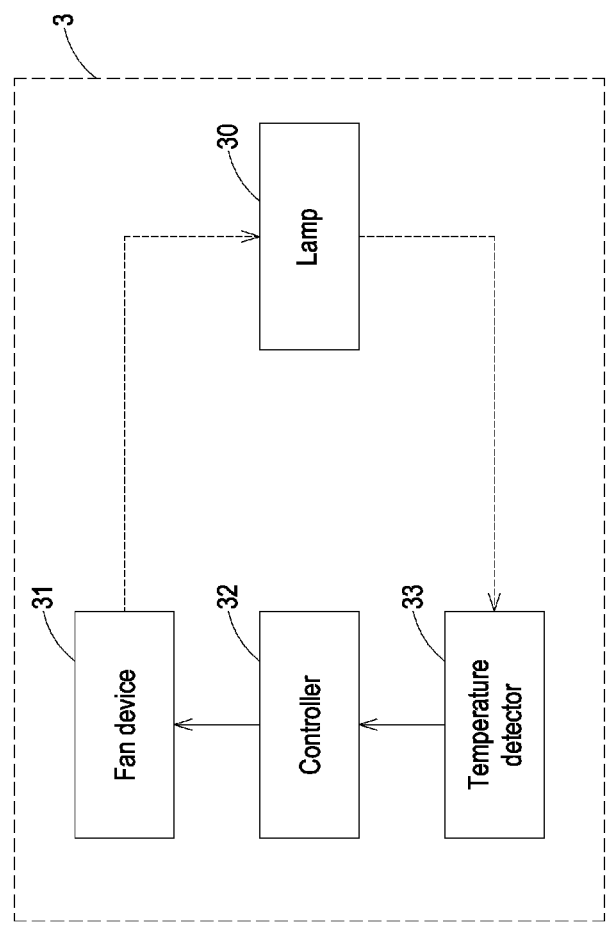
FIG. 3 is a schematic functional block diagram illustrates the architecture of a projection apparatus according to an embodiment of the present invention.

FIG. 3 is a schematic functional block diagram illustrates the architecture of a projection apparatus according to an embodiment of the present invention. As shown in FIG. 3, the projection apparatus 3 comprises a lamp 30, a fan device 31, a controller 32, and a temperature detector 33. An example of the lamp 30 includes but is not limited to an ultra-high pressure (UHP) mercury lamp. The temperature detector 33 is located near the lamp 30 for detecting the temperature of the lamp 30. The fan device 31 is used for generating a wind for removing the heat from the lamp 30. The controller 32 is electrically connected with the fan device 31 and the temperature detector 33. According to the detecting result of the temperature detector 33, the fan device 31 is controlled by the controller 32 to be selectively enabled or disabled.

Figure 4:
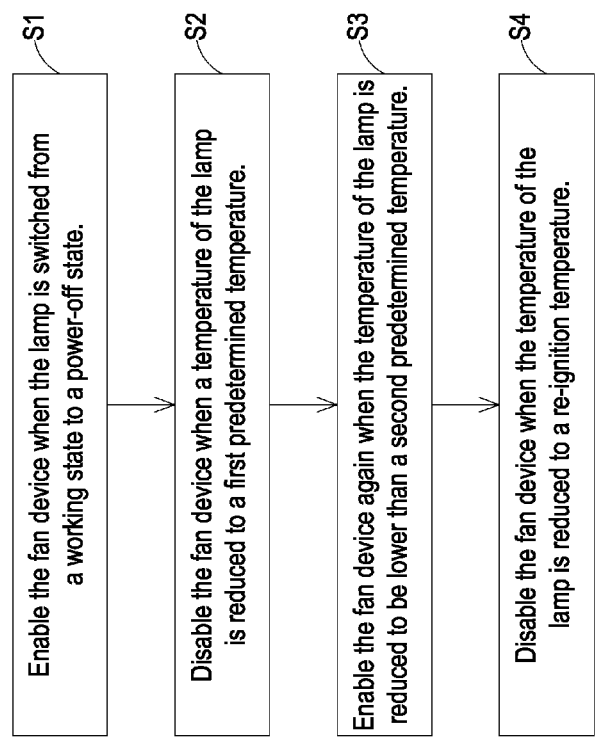
FIG. 4 is flowchart illustrating a fan control method for the projection apparatus of FIG. 4.
Figure 5:
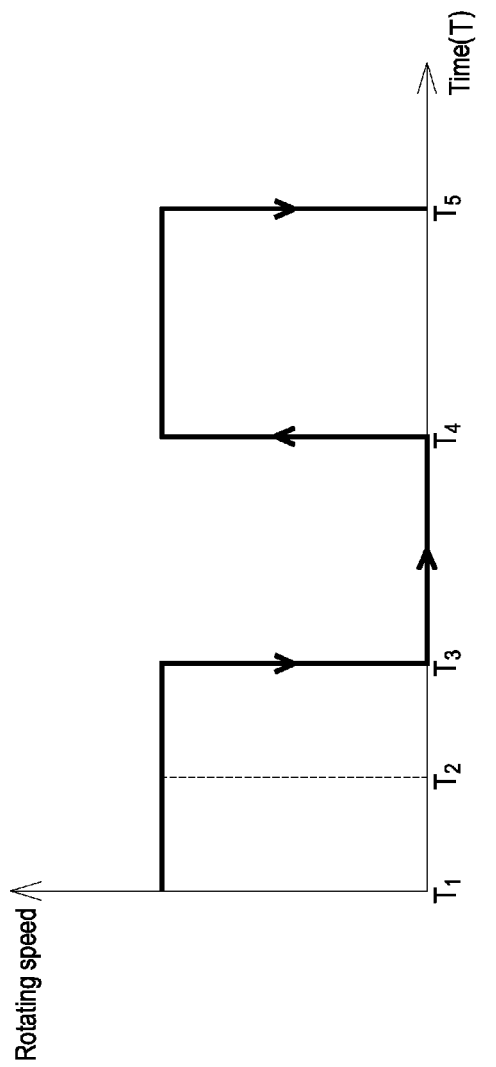
FIG. 5 schematically illustrates the relationship between the rotating speed and the operating time of the fan device of the projection system according to the embodiment of the present invention.

Hereinafter, a method of controlling the fan device 31 by the controller 32 will be illustrated with reference to FIGS. 4 and 5. FIG. 4 is flowchart illustrating a fan control method for the projection apparatus of FIG. 4. FIG. 5 schematically illustrates the relationship between the rotating speed and the operating time of the fan device of the projection system according to the embodiment of the present invention. As shown in FIG. 5, the lamp 30 of the projection apparatus 3 is in a working state from a first time point T1 and a second time point T2, and the fan device 31 is enabled to remove the heat from the lamp 30. At the second time point T2, the projection apparatus 3 is switched from the working state to a power-off state. Consequently, the lamp 30 is also switched from the working state to the power-off state. Meanwhile, the controller 32 starts to implement the fan control method of FIG. 4.

In the step S1, the lamp 30 is switched from the working state to the power-off state. Consequently, the fan device 31 is still enabled by the controller 32. At the time when the lamp 30 is switched from the working state to the power-off state, the temperature of the lamp 30 is about 948° C. Since the fan device 31 is still enabled by the controller 32 at this moment, the temperature of the lamp 30 is gradually reduced by the generated wind of the fan device 31. In other words, the time period of cooling the lamp 30 to the re-ignition temperature (e.g. lower than 100° C.) will be shortened.

When the temperature of the lamp 30 is reduced to a first predetermined temperature at a third time point T3 as shown in FIG. 5, the fan device 31 is disabled by the controller 32 according to the detecting result of the temperature detector 33 (i.e. the step S2). For example, the first predetermined temperature is 515° C. Since the fan device 31 is enabled in the step S1, the cooling rate of the glass of the lamp 30 is faster than the cooling rate of the electrode of the lamp 30. If the temperature of the glass of the lamp 30 is reduced to the condensation point of mercury (e.g. about 300° C.), the mercury vapor may be condensed on the glass rather than the electrode. For preventing from condensation of the mercury vapor on the glass, the fan device 31 should be disabled before the temperature of the lamp 30 is reduced to a temperature higher than the condensation point of mercury. In the step S2, the fan device 31 is disabled when the temperature of the lamp 30 is reduced to the first predetermined temperature. Under this circumstance, since the fan device 31 is disabled, the cooling rate of the electrode is faster than the cooling rate of the glass. Consequently, the temperature of the electrode of the lamp 30 may be reduced to the condensation point of mercury earlier than the temperature of the glass of the lamp 30. In other words, the mercury vapor can be condensed on the electrode.

When the temperature of the lamp 30 is reduced to be lower than a second predetermined temperature at a fourth time point T4 as shown in FIG. 5, the fan device 31 is enabled by the controller 32 again according to the detecting result of the temperature detector 33 (i.e. the step S3). For example, the second predetermined temperature is equal to the condensation point of mercury (e.g. about 300° C.). Since the temperature of the electrode of the lamp 30 is reduced to the condensation point of mercury earlier than the temperature of the glass of the lamp 30, the mercury vapor is condensed on the electrode of the lamp 30 at the fourth time point T4. For further cooling the lamp 30, the fan device 31 is enabled by the controller 32 again, so that the lamp 30 can reach the re-ignition temperature more quickly.

When the temperature of the lamp 30 is reduced to the re-ignition temperature at a fifth time point T5 as shown in FIG. 5, the fan device 31 is disabled by the controller 32 according to the detecting result of the temperature detector 33 (i.e. the step S4). Since the lamp 30 is reduced to the re-ignition temperature, the lamp 30 may be re-ignited again. Under this circumstance, since it is not necessary to use the fan device 31 to remove the heat, the fan device 31 is disabled.

By the fan control method of the present invention comprising the above-described steps in order, the mercury vapor within the lamp 30 can be condensed on the electrode. Moreover, since the fan device 31 is selectively enabled or disabled after the lamp 30 is switched from the working state to the power-off state, the time period for cooling the lamp 30 to the re-ignition temperature is largely shortened.

In the above embodiment, the time interval from the second time point T2 to the third time point T3 is 20 seconds, the time interval from the third time point T3 to the fourth time point T2 is 70 seconds, and the time interval from the fourth time point T4 to the fifth time point T5 is 80 seconds.

The present invention provides a fan control method for a projection apparatus. When the lamp is switched from a working state to a power-off state, the fan device is still maintained in the enabled state in order to remove the heat from the lamp. Then, the lamp is disabled, so that the mercury within the lamp is condensed on the electrode of the lamp. Then, the fan device is enabled again to cool down the lamp to a re-ignition temperature. Consequently, by the fan control method of the present invention, the function of condensing the mercury vapor on the electrode and the function of shortening the time period for cooling the lamp to the re-ignition temperature are both achieved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for controlling a fan device of a projection apparatus to remove heat from a lamp, the method comprising steps of:
   (a) enabling the fan device when the lamp is switched from a working state to a power-off state;
   (b) disabling the fan device when a temperature of the lamp is reduced to a first predetermined temperature;
   (c) enabling the fan device again when the temperature of the lamp is reduced to be lower than a second predetermined temperature; and
   (d) disabling the fan device when the temperature of the lamp is reduced to a re-ignition temperature.

2. The method according to claim 1, wherein the lamp is an ultra-high pressure mercury lamp.

3. The method according to claim 1, wherein when the lamp is switched from the working state to the power-off state, the temperature of the lamp is about 948° C.

4. The method according to claim 1, wherein when the lamp is in the working state, the fan device is enabled.

5. The method according to claim 1, wherein the first predetermined temperature is 515° C., the second predetermined temperature is 300° C., and the re-ignition temperature is 100° C.

6. The method according to claim 1, wherein the second predetermined temperature is equal to a condensation point of mercury within the lamp.

7. A projection apparatus, comprising:
   a lamp;
   a fan device for generating a wind to remove heat from the lamp;
   a temperature detector for detecting a temperature of the lamp; and
   a controller electrically connected with the fan device and the temperature detector for controlling the fan device according to a detecting result of the temperature detector, wherein when the lamp is switched from a working state to a power-off state, the fan device is enabled by the controller, wherein when the temperature of the lamp is reduced to a first predetermined temperature, the fan device is disabled by the controller, wherein when the temperature of the lamp is reduced to be lower than a second predetermined temperature, the fan device is enabled again by the controller, wherein when the temperature of the lamp is reduced to a re-ignition temperature, the fan device is disabled by the controller.

* * * * *